(12) United States Patent
Shirota et al.

(10) Patent No.: US 8,014,579 B2
(45) Date of Patent: Sep. 6, 2011

(54) MICROSCOPE SYSTEM AND METHOD FOR SYNTHESIZING MICROSCOPIC IMAGES

(75) Inventors: Tetsuya Shirota, Tokyo (JP); Takashi Yoneyama, Sagamihara (JP)

(73) Assignee: Olympus Corporation, Tokyo (JP)

( * ) Notice: Subject to any disclaimer, the term of this patent is extended or adjusted under 35 U.S.C. 154(b) by 1150 days.

(21) Appl. No.: 11/801,694

(22) Filed: May 10, 2007

(65) Prior Publication Data

US 2007/0285769 A1    Dec. 13, 2007

(30) Foreign Application Priority Data

May 24, 2006    (JP) .................................. 2006-144664

(51) Int. Cl.
    *G06K 9/00* (2006.01)
(52) U.S. Cl. ........................................ 382/128; 359/380
(58) Field of Classification Search .................... 382/128
    See application file for complete search history.

(56) References Cited

U.S. PATENT DOCUMENTS

| | | | |
|---|---|---|---|
| 2004/0119817 A1* | 6/2004 | Maddison et al. | 348/79 |
| 2006/0018013 A1 | 1/2006 | Suzuki et al. | |
| 2006/0045388 A1 | 3/2006 | Zeineh et al. | |
| 2007/0121198 A1 | 5/2007 | Suzuki et al. | |
| 2007/0285768 A1 | 12/2007 | Kawanabe et al. | |

FOREIGN PATENT DOCUMENTS

| | | |
|---|---|---|
| EP | 1 324 097 A2 | 7/2003 |
| JP | 7-333522 A | 12/1995 |
| JP | 2002-014288 A | 1/2002 |
| JP | 2004-309768 A | 11/2004 |
| WO | WO 01/27679 A1 | 4/2001 |

OTHER PUBLICATIONS

Suzuki, English version of JP-2004-309768, the translation was made by machine.*
Extended European Search Report dated Feb. 13, 2009 (8 pages), issued in counterpart European Application Application Serial No. 07009331.5.
U.S. Appl. No. 11/801,697; First Named Inventor: Hideyuki Kawanabe; Title: "Microscope system and method for synthesizing microscopic images"; Filed: May 10, 2007.

* cited by examiner

*Primary Examiner* — Samir A Ahmed
*Assistant Examiner* — Ruiping Li
(74) *Attorney, Agent, or Firm* — Holtz, Holtz, Goodman & Chick, PC

(57) ABSTRACT

An observation state obtainment unit obtains an observation state of a microscope at the time of obtaining the microscopic image of a specimen obtained by using the microscope. A motion image data generation unit generates data of a motion image from the microscopic images of a time series. A correlation addition unit adds, to data of the motion image, information that correlates microscopic images constituting the motion image with an observation state of the microscope at the time of obtaining the microscopic images. A record unit records data of the motion image and an observation state of the microscope correlated with the data.

8 Claims, 14 Drawing Sheets

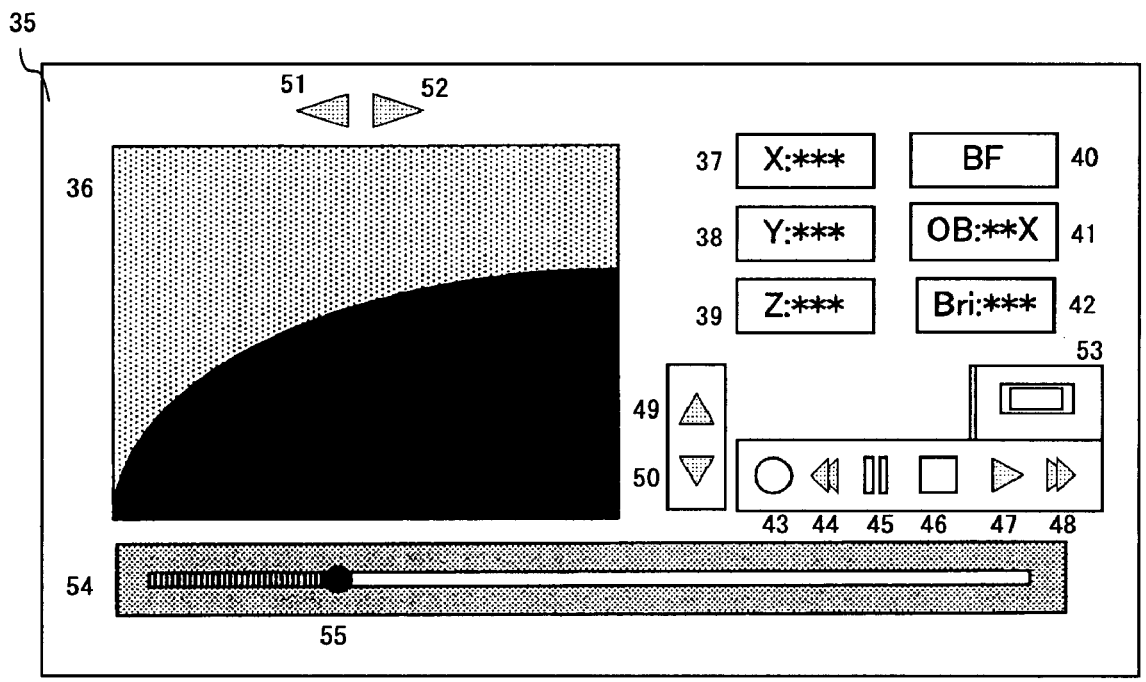
F I G. 7

F I G. 9

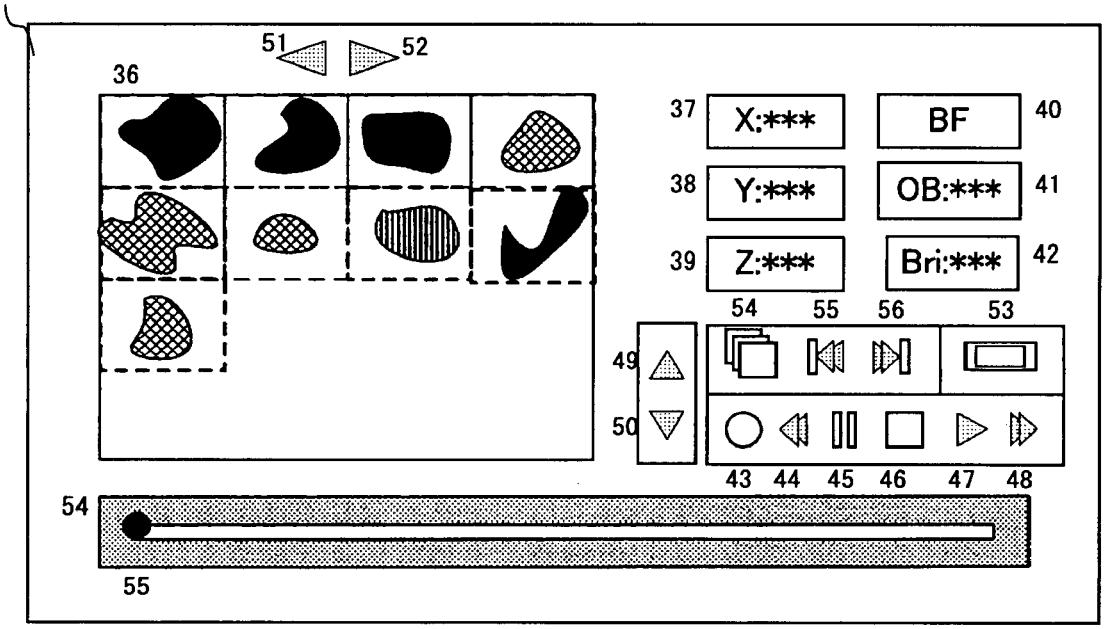
F I G. 12

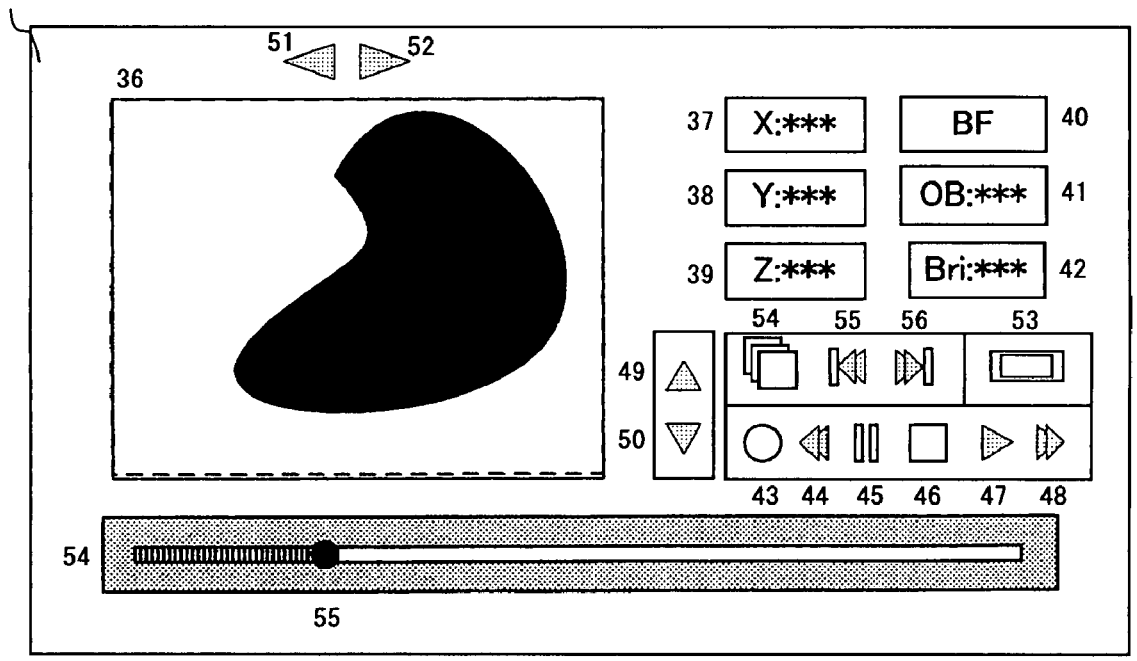
F I G. 13

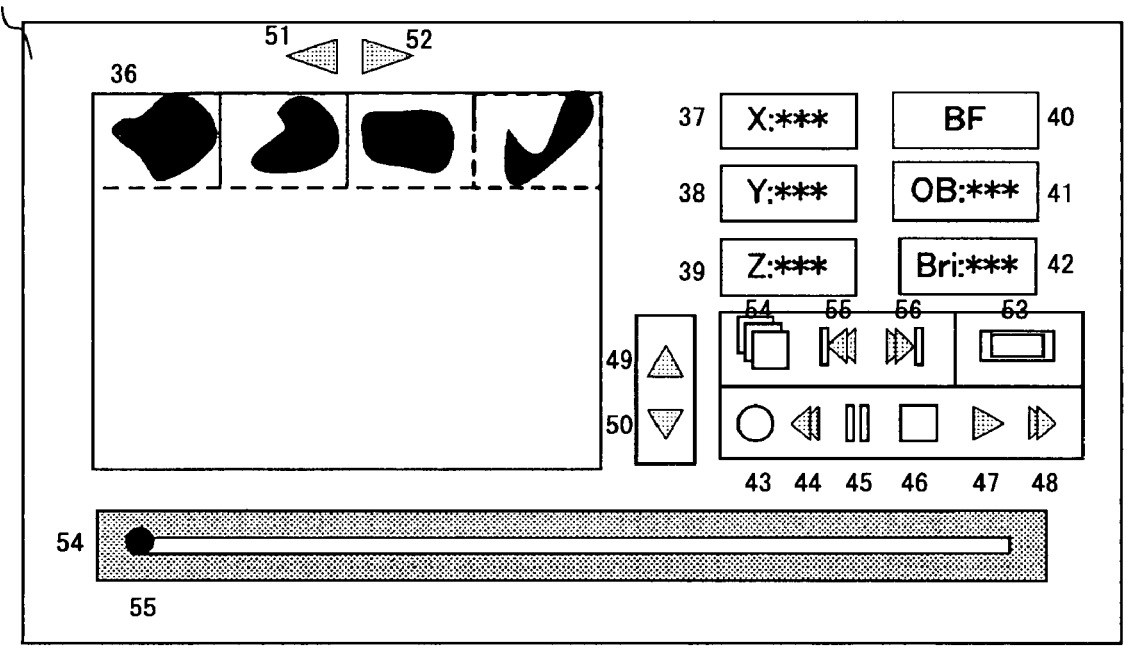
F I G. 1 4

MICROSCOPE SYSTEM AND METHOD FOR SYNTHESIZING MICROSCOPIC IMAGES

CROSS REFERENCE TO RELATED APPLICATIONS

This application claims benefit of Japanese Application No. 2006-144664, filed May 24, 2006, the contents of which are incorporated by this reference.

BACKGROUND OF THE INVENTION

1. Field of the Invention

The present invention relates to a technique used for a microscope and in particular to a technique for alleviating a workload required for an observation by using a microscope.

2. Description of the Related Art

Microscopes are widely used for researches, examinations, et cetera, in the fields of biology and industry. In an examination carried out by using a microscope, commonly exercised is to provide a plurality of object lenses with different magnification ratios and observe an observed specimen by moving a motorized stage for moving the specimen within a plane perpendicular to an observation light path from the direction of an object lens. In such an observation, a screening is carried out by setting an object lens at low magnification so as to cover the entirety of the observed specimen. Then, it is followed by returning to a point in which an abnormality has been discovered and that for which a recording is desired in the observation specimen, examining these points in details by changing over to an object lens of a higher magnification and recording the observation data.

As an example related to a microscope suitable to such an observation, a Laid-Open Japanese Patent Application Publication No. 07-333522 has disclosed a microscopic image remote observation apparatus enabling an observation by displaying an image of an attention region in a motion image on one hand and, on the other, an image of the peripheral region including the aforementioned attention region, in a still image.

And, as another example, a Laid-Open Japanese Patent Application Publication No. 2002-14288 has disclosed a microscope system capable of securely reproducing a content that is set in a microscope at the time of obtaining a microscopic image that is a still image in a later time.

And, as yet another example, a Laid-Open Japanese Patent Application Publication No. 2004-309768 has disclosed a microscope system capable of reproducing a setup state of each part without repeating a cumbersome adjustment work.

In order to return to the point of which an observation record needs to be saved by a use of an object lens of a high magnification ratio in the observation specimen after carrying out a screening observation with the object lens of a low magnification ratio in the screening process as described above, the point needs to be searched by operating the microscope system again. If a point in need of recording is selected because a plurality of such points exists, the operation of the microscope gives a large amount of load on the operator. Particularly, if a quick decision is required or a large amount of specimens is required to observe at once, a capability of recording the point quickly and easily is very important.

SUMMARY OF THE INVENTION

A microscope system according to one of aspects of the present invention comprises a microscope for obtaining a microscopic image of a specimen; an observation state obtainment unit for obtaining an observation state of the microscope at the time of obtaining the microscopic image; a motion image data generation unit for generating data of a motion image from the microscopic images of a time series; a correlation addition unit for adding, to data of the motion image, information that correlates microscopic images constituting the motion image with an observation state of the microscope at the time of obtaining the microscopic images; and a record unit for recording data of the motion image and an observation state of the microscope correlated with the data.

A method for recording a microscopic image according to one of other aspects of the present invention comprises obtaining an observation state of a microscope at the time of obtaining the microscopic image of a specimen obtained by using the microscope; generating data of a motion image from the microscopic images of a time series; adding, to data of the motion image, information that correlates microscopic images constituting the motion image with an observation state of the microscope at the time of obtaining the microscopic images; and recording data of the motion image and an observation state of the microscope correlated with the data.

BRIEF DESCRIPTION OF THE DRAWINGS

The present invention will be more apparent from the following detailed description when the accompanying drawings are referenced.

FIG. 7 is a diagram showing a third example of a screen display when displaying an image of a specimen of which motion image data is recorded in a data recording unit;

FIG. 9 is a diagram describing a calculation of coordinates indicating a position of a specimen by an interpolation arithmetic operation;

FIG. 12 is a diagram showing a fifth example of a screen display when displaying an image of a specimen of which motion image data is recorded in a data recording unit;

FIG. 13 is a diagram showing a sixth example of a screen display when displaying an image of a specimen of which motion image data is recorded in a data recording unit; and FIG. 14 is a diagram showing a seventh example of a screen display when displaying an image of a specimen of which motion image data is recorded in a data recording unit.

DESCRIPTION OF THE PREFERRED EMBODIMENTS

The following is a description of the preferred embodiment of the present invention by referring to the accompanying drawings.

Figure 1:
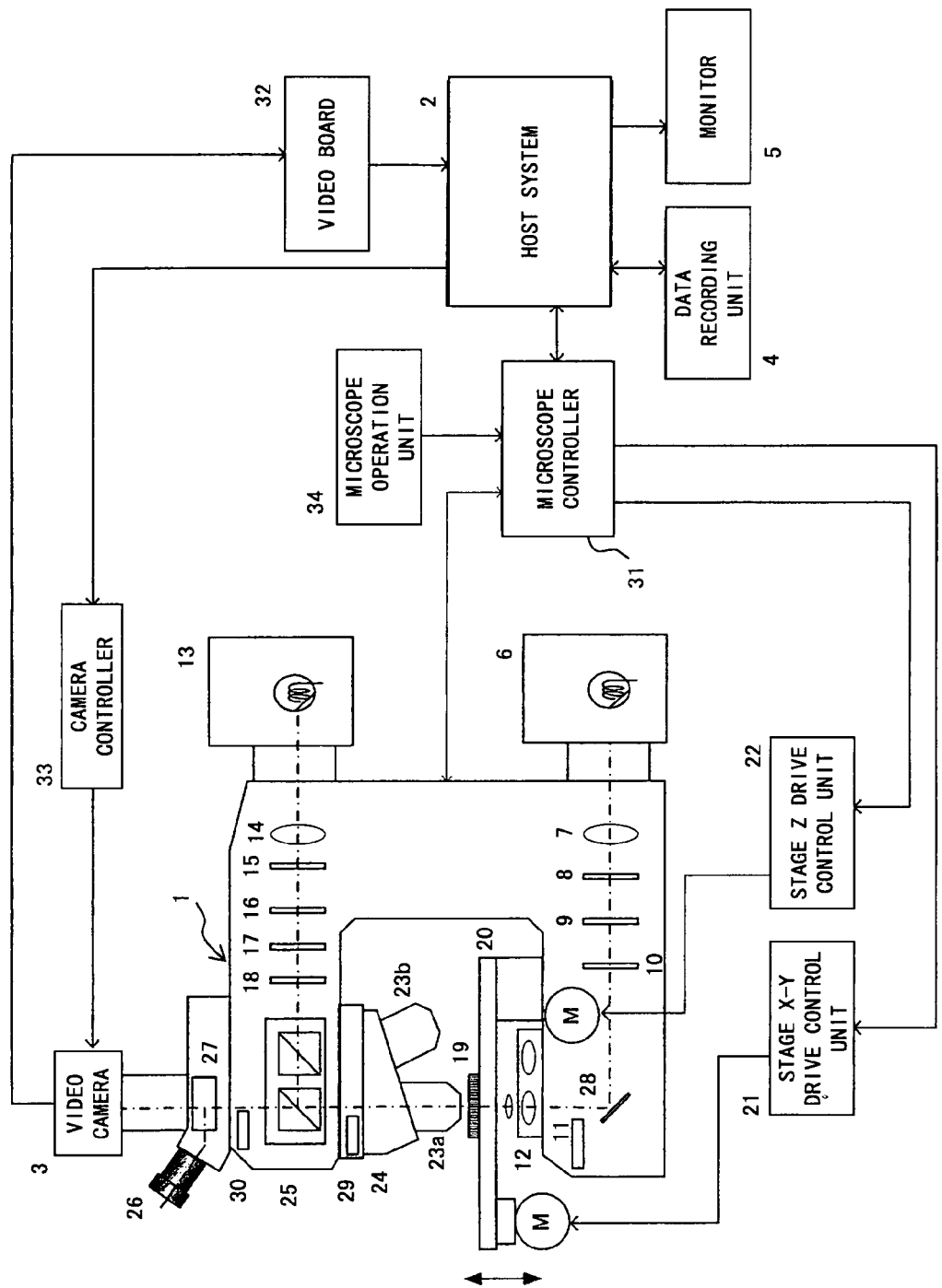
FIG. 1 is a diagram showing a configuration of a microscope system embodying the present invention.

FIG. 1 shows a configuration of a microscope system according to the present embodiment.

Referring to FIG. 1, a host system 2 connected to a microscope apparatus 1 controls it and also records motion image data of a specimen 19, an observation state of the microscope apparatus 1 and coordinates of the specimen 19 by synchronizing the three of them. A video camera 3 photographs a microscopic image, of the specimen 19, obtained by using the microscope apparatus 1. A monitor 5 connected to the host system 2 displays various images.

The microscope apparatus 1 comprises a transmission observation-use optical system and an incident-light observation optical system. Here, comprised in the microscope apparatus 1 as the transmission observation-use optical system are a transmission illumination-use light source 6, a collector lens 7 for condensing the illumination light thereof, a transmissive filter unit 8, a transmission visual field aperture 9, a transmission aperture stop 10, a condenser optical element unit 11, and a top lens unit 12. Meanwhile, comprised in the microscope apparatus 1 as the incident-light observation optical system are an incident-light illumination-use light source 13, a collector lens 14 for condensing the illumination light thereof, an incident-light-use filter unit 15, an incident-light shutter 16, an incident-light visual field aperture 17 and an incident-light aperture stop 18.

A motorized stage 20 on which the specimen 19 is placed and which is freely movable in either of the up, down, left and right directions is equipped in an observation light path where the light path of the transmission observation-use optical system overlaps with that of the incident-light observation optical system. A movement of the motorized stage 20 is controlled by a stage X-Y drive control unit 21 and a stage Z drive control unit 22. Note that the motorized stage 20 comprises an origin detection function by means of an origin sensor (not shown in a drawing herein), thereby enabling a movement control of the specimen 19 placed on the motorized stage 20 by a coordinate detection and a coordinate designation.

Also comprised in the observation light path are a revolver 24, a cube unit 25 and a beam splitter 27. Here, the revolver 24 is used for selecting an object lens used for an observation from among the object lenses 23a, 23b and so on (generically named as "object lens 23" as appropriate hereinafter) by a revolving operation. The cube unit 25 is used for changing over the microscopy. The beam splitter 27 is used for splitting an observation light path between the sides of an eye piece lens 26 and a video camera 3.

Meanwhile, a polarizer 28, a Differential Interference Contrast (DIC) prism 29 and an analyzer 30 are comprised for observing a differential interference, making it possible to insert them into the observation light path on an as required basis. Note that these individual units are motorized and the operations are controlled by a microscope controller 31.

The microscope controller 31 connected to the host system 2 has the function as microscope control means for controlling operations of the entirety of the microscope apparatus 1. That is, the microscope controller 31 changes the microscopy and adjusts the brightness of the transmission illumination-use light source 6 and incident-light illumination-use light source 13 in accordance with a control signal from the host system 2 in addition to carrying out the control as described above. The microscope controller 31 also has the function of notifying the host system 2 of the current microscopic examination state of the microscope apparatus 1. Furthermore, the microscope controller 31 is connected to the stage X-Y drive control unit 21 and stage Z drive control unit 22, and therefore the motorized stage 20 can be controller from the host system 2.

A microscope operation unit 34 is a hand switch comprising various input units for obtaining an input of an instruction for operating the microscope apparatus 1 as input of a series separate from the host system 2. The hand switch comprises a joy stick or encoder (not shown in a drawing herein) for example, making it possible to operate the motorized stage 20 by operating these.

A microscopic image of the specimen 19 picked up by the video camera 3 is imported to the host system 2 byway of a video board 32. The host system 2 is capable of carrying out the on/off and gain setup of an automatic gain control, and the on/off of an automatic exposure control and a setup of exposure time by way of a camera controller 33. The host system 2 is also capable of storing a microscopic image of the specimen 19 sent from the video camera 3 as motion image data and still image data in a data recording unit 4. The motion image data and still image data recorded in a data recording unit 4 can be read by the host system 2 and displayed by the monitor 5 that is an image display unit.

Moreover, the host system 2 provides a so-called video auto focus (AF) function that is a focusing operation based on a contrast of a microscopic image picked up by the video camera 3.

Note that the host system 2, being just a standard configuration computer, comprises a central processing unit (CPU) for managing an operation control of the entirety of the microscope system by executing a control program; main memory used by the CPU as work memory on an as required basis; an input unit, such as mouse and key board, for obtaining various instructions from a user; an interface unit for managing an exchange of various data between the individual constituent components of the microscope system; and an auxiliary storage apparatus, such as a hard disk apparatus, for storing various programs and data.

The following is a description of an operation of the microscope system as a first embodiment of the present invention.

Figure 2:
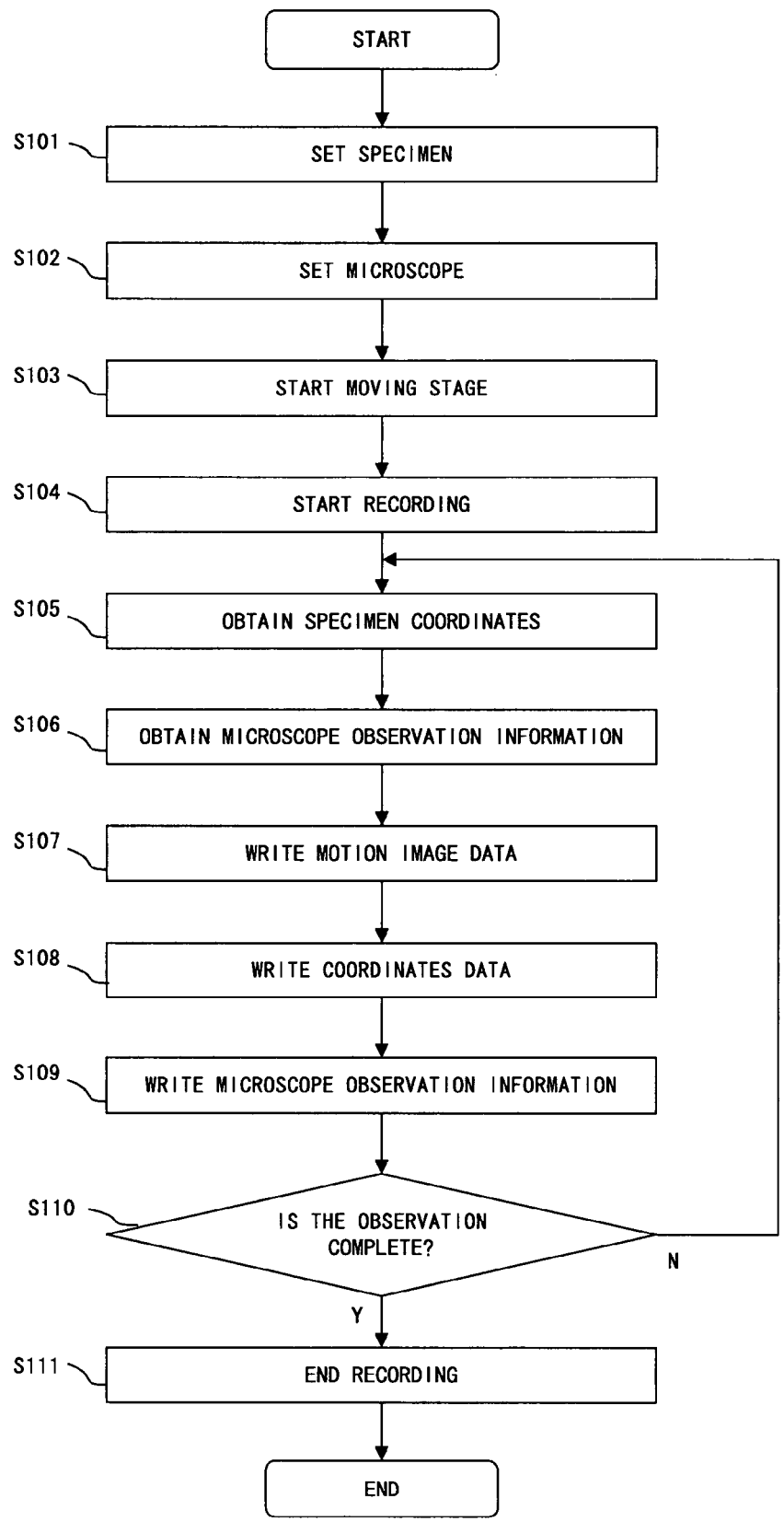
FIG. 2 is a diagram showing a first example of a process content of a process for recording motion image data at the time of a screening work by a flow chart.

The first is a description on an operation at the time of a screening work. FIG. 2 is a diagram showing a first example of a process content of a process for recording motion image data carried out by the host system 2 at the time of a screening work by a flow chart. This process is for obtaining motion image data at the time of carrying out a screening for the specimen 19 at the microscope system shown in FIG. 1. The process is achieved by the CPU of the host system 2 executing a prescribed control program.

Figure 3:
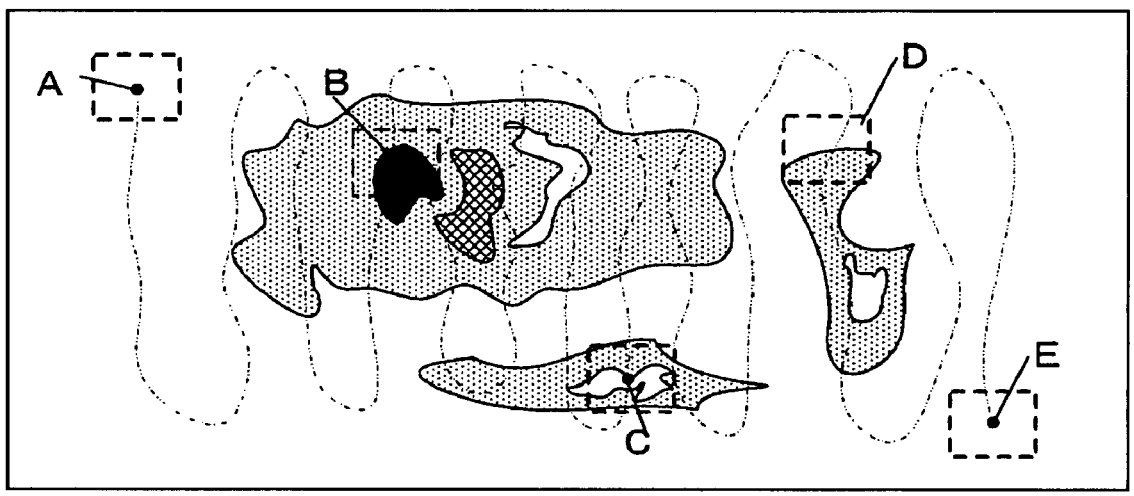
FIG. 3 is a diagram showing a first example of a path of screening a specimen.

FIG. 3 is a diagram showing a first example of a path of screening the specimen 19. Referring to FIG. 3, the curve shown by the double dot chain line indicates a path of a screening by using an object lens of a low magnification ratio. A zone shown by a dotted-line rectangle in FIG. 3 represents a range of field of vision of the object lens 23 of a low magnification ratio. The assumption here is that the screening is carried out by a transmissive bright field observation.

Referring to FIG. 2, first in (the step) S101, carried out is the process for moving the motorized stage 20 to a predetermined position in order to carry out a setup work of the specimen 19 to the motorized stage 20.

Upon completing the setup of the specimen 19, the process proceeds to S102 and a microscope setup process is carried out. This process, by controlling the microscope apparatus 1, changes over various optical elements to be used for the transmissive bright field observation and the object lenses 23 of low magnification ratios to be used for the screening.

In S103, started is the process for obtaining a content of a user operating a joy stick and encoder equipped in the microscope operation unit 34 and moving the motorized stage 20 in accordance with the obtained operation content. The path of the point A to E shown by the double dot chain line in the example of FIG. 3 is the path of the screening instructed by the user in this event.

Upon starting the movement of the motorized stage 20, a recording process is started for generating motion image data based on microscopic images of the specimen 19 picked up by the video camera 3 in a time series and recording it in the data recording unit 4 in S104. A repetition of the subsequent processes S105 through S110 results in recording a motion image of the specimen 19.

In S105 and S106, carried out is the process for making the host system 2 function as observation state obtainment unit for obtaining an observation state of the microscope apparatus 1 at the time of obtaining a microscopic image of the specimen 19. That is, carried out in the S105 is the process for obtaining the coordinate data of the motorized stage 20 indicating the current position of the specimen 19 by way of the microscope controller 31. Then, carried out in the subsequent S106 is the process for obtaining microscope information indicating the current observation state of the microscope apparatus 1, such as object lens information identifying the currently used object lens 23, brightness adjustment value information indicating brightness of the transmission illumination-use light source 6 and microscopy information indicating a microscopy.

Then carried out in S107 through S109 is the process for making the host system 2 function as correlation addition unit and record unit that make the data recording unit 4 record the picked-up microscopic image of the specimen 19 and the observation state of the microscope apparatus 1 at the time of obtaining the microscopic image by correlating with each other. That is, the process for recording the data of the current microscopic image (i.e., the image for one frame in the motion image data) of the specimen 19 in the data recording unit 4 is carried out in the S107. Then carried out in the subsequent S108 is the process for recording, in the data recording unit 4, the coordinates data obtained by the process of the S105 by adding the microscopic image data recorded by the process of the S107.

The process of the above described S107 through S109 results in recording, in the data recording unit 4, by adding coordinates data (B_x, B_y, B_z) indicating a position of the point B in the specimen 19, object lens information (B_ob), brightness adjustment value information (B_bright), microscopy information (B_posi) and such to microscopic image data at the point B shown in FIG. 3, followed by the aforementioned microscopic image data being correlated with the motion image data.

Note that the present embodiment is configured to carry out the process for adding coordinate data and microscope information to motion image data at a constant time interval. An alternative configuration may be in a manner to change the intervals of carrying out the process based on a movement speed of the motorized stage 20. An alternative configuration may also be in a manner to add update information only if a content of information is changed, in place of adding the microscope information at a certain time interval.

In S110, carried out is the process for judging whether or not the observation is completed with the movement to the end point (i.e., the point E in the example of FIG. 3) of the screening path being finished. Here, if the judgment is that the observation is completed (i.e., the judgment result is "yes"), the process for ending the recording process started by the process of the S104 is carried out in S111, followed by finishing the recording process for the motion image data shown in FIG. 2. Contrarily, if the judgment is that the observation is not yet completed (i.e., the judgment result is "no"), the process returns to the S105 for repeating the above described process.

Thusly carrying out the above described process results in recording the coordinate data of the specimen 19 together with the microscope information at each position in a screening path synchronized with the record of the motion image data obtained by observing the specimen 19 along the path.

The next is a description of an operation for finding a point of observing in detail from the recorded specimen, reproducing the observation state of the microscope apparatus 1 at the time of observing the point and recording observation data by observing the point in detail by using an object lens 23 of a high magnification ratio, after completing a screening for the specimen 19 carried out by using an object lens 23 of a low magnification ratio.

Figure 4:
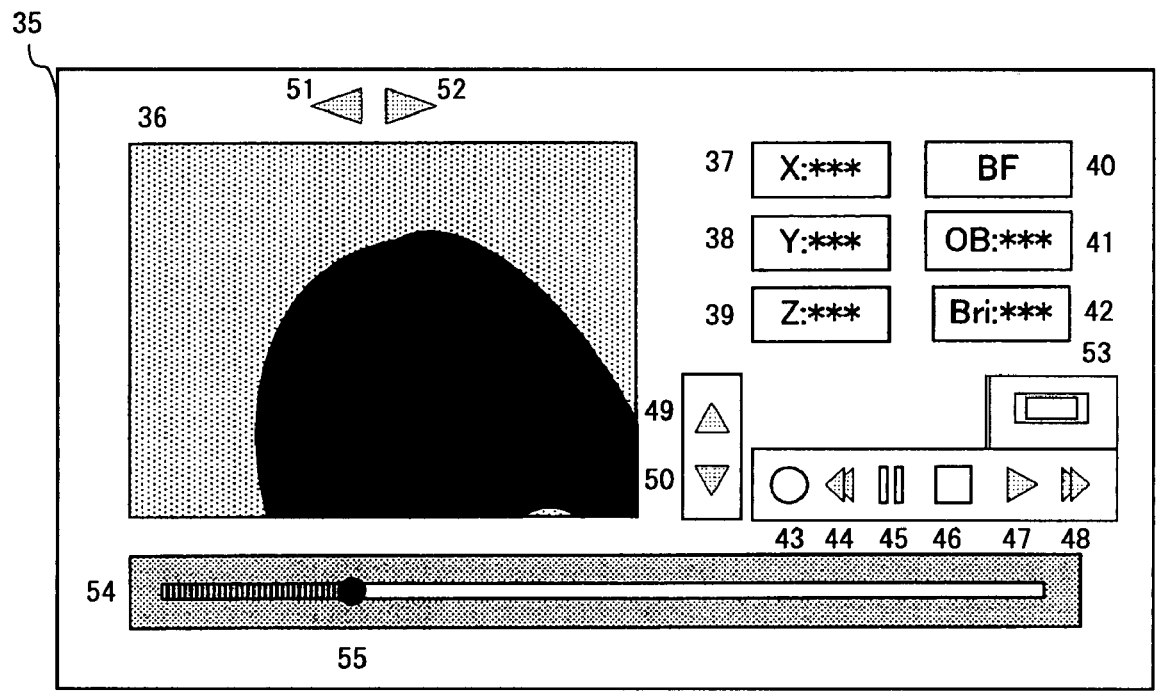
FIG. 4 is a diagram showing a first example of a screen display when displaying an image of a specimen of which motion image data is recorded in a data recording unit.

First, a description is on FIG. 4 which shows a first example of a screen display when displaying an image of the specimen 19 of which motion image data is recorded in the data recording unit 4.

Referring to FIG. 4, a replay window 35 comprises a display reproduction screen of an image of the specimen 19 obtained by a screening work, an operation unit for instructing an operation of the reproduction display, and such. Here, the various buttons displayed as the operation unit can be operated by a moving operation, and a click operation, of an index cursor onto the present button for a pointing device of a mouse apparatus or such (not shown in a drawing herein) for example.

A display window 36 is the one functioning as display unit for displaying a microscopic image of the specimen 19 by replaying the motion image recorded in the data recording unit 4. Note that the display window 36 allows the current image (i.e., a live image) of the specimen 19 that is being imaged by the video camera 3. FIG. 4 exemplifies a display of the image of the point B indicated in FIG. 3 in the display window 36. Incidentally, a changeover between a live image and a recorded motion image is carried out by an operation of a live image display changeover button 51 or 52.

Coordinate display windows 37, 38 and 39 are windows for displaying each coordinate of X, Y and Z indicating a position of a displayed region of the specimen 19 of which a motion image is currently displayed in the display window 36.

A microscopy window 40, an object lens window 41 and a brightness control value window 42 are windows for displaying respective pieces of microscope information at the time of obtaining the image currently displayed in the display window 36. Here, the microscopy window 40 displays the microscopy, the object lens window 41 displays the magnification ratio of the object lens 23, and the brightness control value window 42 displays the brightness control value of the transmission illumination-use light source 6.

A replay button 47 is the one for instructing a start of a display reproduction of a motion image of the specimen 19. A display stop button 46 is the one for instructing a stop of the display reproduction. A temporary pause button 45 is the one for instructing a temporary pause and a recovery from the pause of the currently displayed motion image. A record button 43 is the one for instructing recording of an image of the specimen 19 being imaged by the video camera 3. A rewind button 44 and a fast forward button 48 are the ones for instructing a rewind and a fast forward, respectively, of the motion image of the specimen 19 currently displayed in the display window 36.

A replay bar 54 is used for indicating a replay position relative to the entirety of the motion image of the image currently displayed in the display window 36. A replay position display cursor 55 moves along the replay bar in accordance with a replay of the motion image. A sliding operation of the replay position display cursor 55 makes it possible to change a display image in the display window 36 over to an image of a replay position indicated by a post-sliding, replay position display cursor 55.

A reproduction button 53 is the one functioning as reproduction instruction obtainment unit for obtaining an instruction for reproducing the observation state of the microscope apparatus 1 at the time of obtaining the microscopic image currently displayed in the display window 36.

A detail display button 50 is the one for obtaining an instruction for changing a display image in the display window 36 from a motion image over to a detail still image photographed by using an object lens of a high magnification ratio. A motion image display button 49 is the one for instructing for changing a display image in the display window 36 from the present detail still image over to a motion image.

Figure 5:
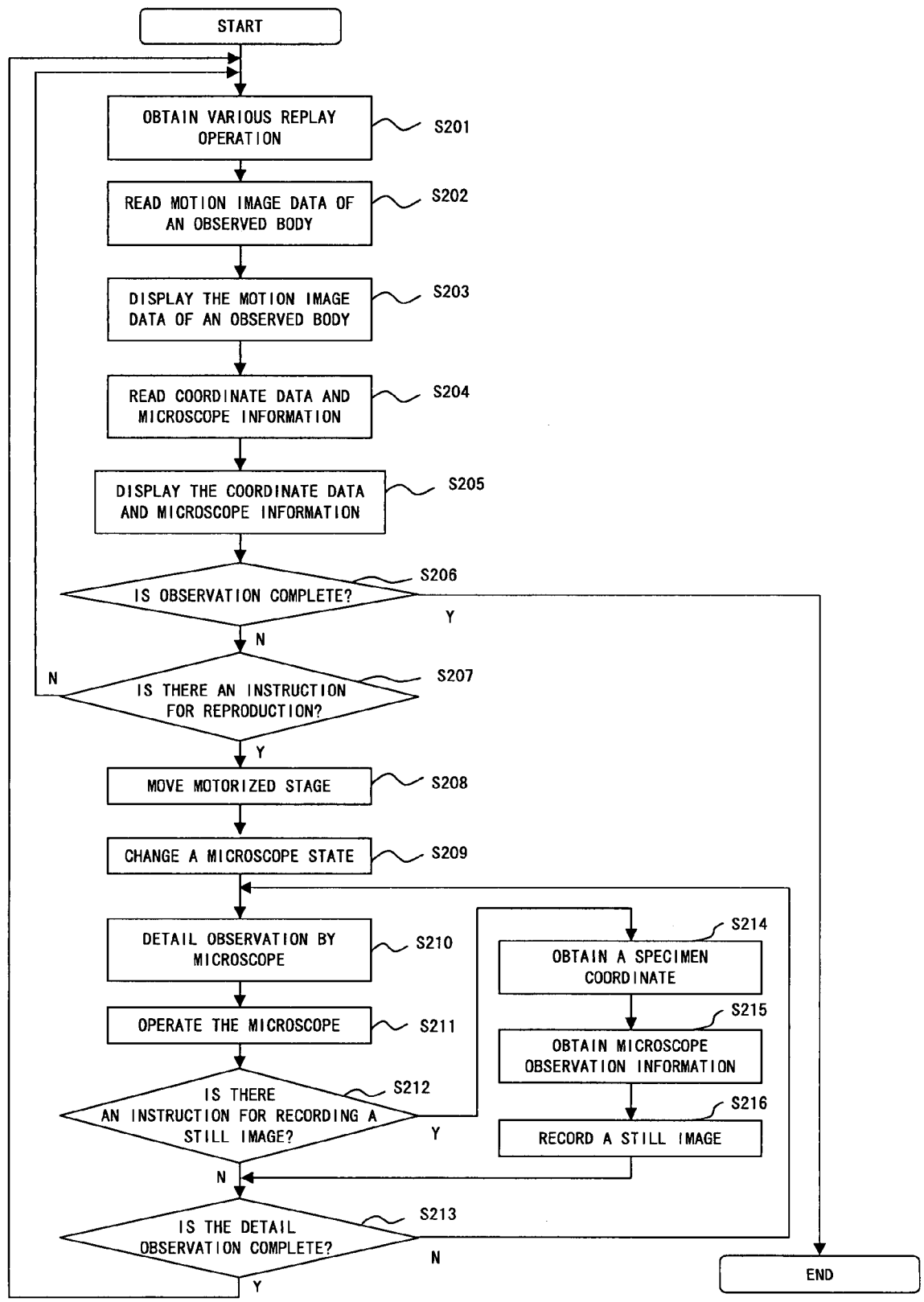
FIG. 5 is a diagram showing a process content, in a flow chart, of a control process for displaying an image of a specimen of which motion image data is recorded in a data recording unit.

The next is a description on FIG. 5 which shows a process content, in a flow chart, of a control process carried out by the host system 2 for displaying an image of the specimen 19 of which motion image data is recorded in the data recording unit 4. This process is also achieved by the CPU comprised by the host system 2 executing a prescribed control program.

As the control process of FIG. 5 is started, the replay window 35 shown in FIG. 4 is displayed in the monitor 5, followed by S201 first obtaining contents of various replay operation by the user operating on the replay window 35 and carrying out the process of a display reproduction in accordance with the present content in the display window 36.

In S202, carried out is the process for reading motion image data of the specimen 19 recorded in the data recording unit 4. In the subsequent S203, carried out is the process for making the display window 36 display the amount of one frame of the motion image of the specimen 19 expressed by the readout motion image data.

In S204, carried out is the process for reading coordinate data indicating a position, in the specimen 19, of the image currently displayed in the display window 36 and microscope information at the time of obtaining the image currently displayed, which are recorded in the recording unit 4. In the subsequent S205, carried out is the process for making the coordinate display windows 37, 38 and 39, microscopy window 40, object lens window 41 and brightness control value window 42 respectively display the readout coordinate data and microscope information.

In S206, the process for judging whether or not an instruction for an observation end is obtained is carried out. Here, the judgment is that the present instruction is obtained (i.e., the judgment result is "yes"), the control process of FIG. 5 ends. Contrarily, if the judgment is that the present instruction is not yet obtained (i.e., the judgment result is "no"), the process proceeds to S207.

Now, a description is on a specific example of the process of the above described S201 through S205.

As an example, let it be assumed a case of displaying the image of the point B of the specimen 19 in the display window 36 as shown in FIG. 4. In this case, the coordinates (B_x, B_y, B_z) indicating the position of the point B of the specimen 19 are respectively displayed in the coordinate display windows 37, 38 and 39, and also the object lens information (B_ob), brightness adjustment value information (B_bright), microscopy information (B_posi) at the time of obtaining the present image are respectively displayed in the object lens window 41, brightness control value window 42 and microscopy window 40.

Figure 6:
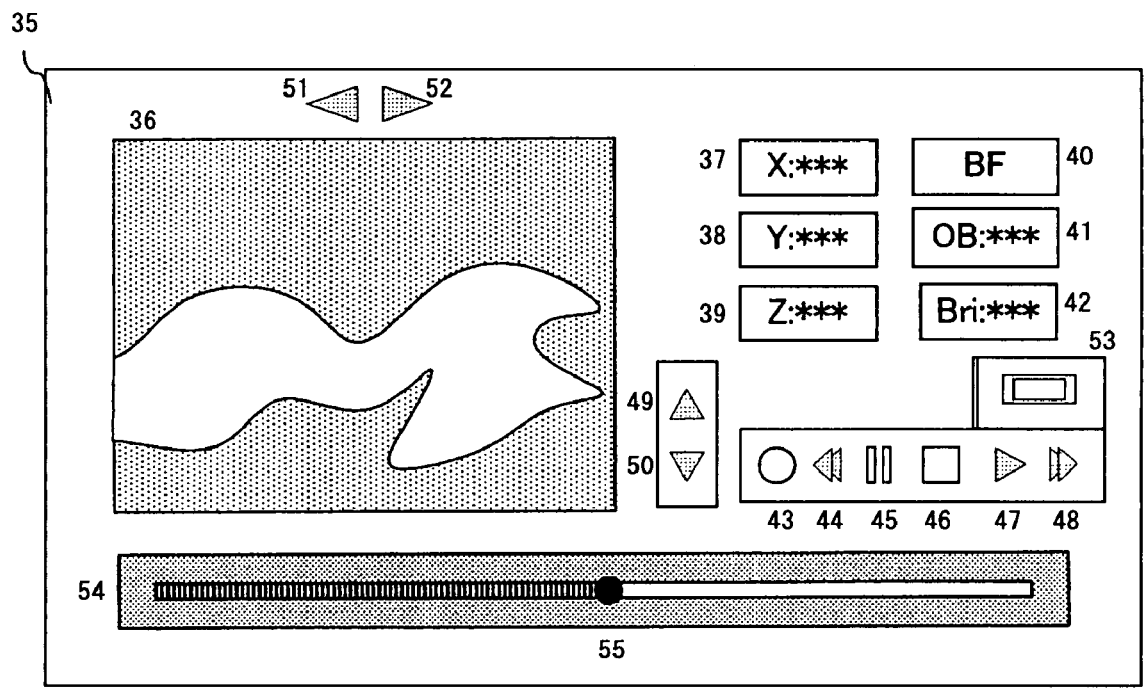
FIG. 6 is a diagram showing a second example of a screen display when displaying an image of a specimen of which motion image data is recorded in a data recording unit.

As another example, let it be assumed a case of displaying the image of the point C of the specimen 19 in the display window 36 as shown in FIG. 6. In this case, the coordinates (C_x, C_y, C_z) indicating the position of the point C of the specimen 19 are respectively displayed in the coordinate display windows 37, 38 and 39, and also the object lens information (C_ob), brightness adjustment value information (C_bright), microscopy information (C_posi) at the time of obtaining the present image are respectively displayed in the object lens window 41, brightness control value window 42 and microscopy window 40.

Under the state of such a replay window 35 being displayed, the process of a display reproduction in accordance with the operation content by the user operated on the operation unit of the replay window 35 is carried out by the process of the S201.

As an example, if an operation for the fast forward button 48 is obtained, a fast forward display reproduction process is carried out for the motion image of the specimen 19 currently displayed in the display window 36. As another example, if an operation for the rewind button 44 is obtained, a rewind display reproduction process is carrier out for the motion image of the specimen 19 currently displayed in the display window 36. Note that the present embodiment is configured to increase a replay speed of a fast forward display reproduction, and that of a rewind display reproduction, of the motion image by 2×, 4×, 8× and so on, in accordance with the number of pressing operation on the fast forward button 48 and rewind button 44, respectively.

As yet another example, if an operation for the temporary pause button 45 is obtained, a temporary pause is carried out with the motion image of the specimen 19 that is display-reproduced in the display window 36 being displayed. A sliding of the replay position display cursor 55 of the replay bar 54 in the temporary pause state results in displaying an image of a replay position indicated by the post-sliding, replay position display cursor 55 in the state of a temporary pause in the display window 36.

The user makes the display window 36 display a motion image of the specimen 19 by making the best use of such various replay operations, thereby working on searching a point for carrying out a detail observation based on the motion image of the specimen 19.

As an example, let it be assumed a case of selecting the image the point B shown in FIG. 3 as a point for carrying out a detail observation. In this case, the reproduction button 53 is pressed for operation when the coordinates (B_x, B_y, B_z) indicating the position of the point B of the specimen 19 are respectively displayed in the coordinate display windows 37, 38 and 39, and also the object lens information (B_ob), brightness adjustment value information (B_bright), microscopy information (B_posi) at the time of obtaining the present image are respectively displayed in the object lens window 41, brightness control value window 42 and microscopy window 40. A presence or absence of the pressing for operation is judged by the process of the S207.

Now a description is of the processes of the S207 and thereafter shown in FIG. 5.

In the S207, carried out is the process for judging whether or not an instruction for reproducing the observation state of the microscope apparatus 1 at the time of obtaining the image currently displayed in the display window 36 by pressing the reproduction button 53 is obtained. Here, if the judgment is that the aforementioned instruction is obtained (i.e., the judgment result is "yes"), the process proceeds to S208. Contrarily, if the judgment is that the aforementioned instruction is not obtained (i.e., the judgment result is "no"), the process returns to the S201 and the above described process is repeated.

In S208 and S209, carried out is the process for making the microscope apparatus 1, by controlling it, reproduce the observation state at the time of obtaining the microscopic image displayed in the display window 36 when the reproduction button 53 was pressed. That is, first carried out in the S208 is the process for making the motorized stage 20 move to a position indicated by coordinates by notifying the microscope controller 31 of the coordinates displayed in the coordinate display windows 37, 38 and 39. Then, carried out in the subsequent S209 is the process for notifying the microscope controller 31 of the various pieces of information respectively displayed in the object lens window 41, brightness control value window 42 and microscopy window 40, thereby making the microscope controller 31 change over the object lenses 23, control the brightness of the transmission illumination-use light source 6, and change over the microscopy.

As an example, let it be assumed a case of obtaining a press operation of the reproduction button 53 in a state of the image at the point B (shown in FIG. 3) being displayed. In this case, carried out is the process for notifying the microscope controller 31 of the coordinates (B_x, B_y, B_z) indicating the position of the point B of the specimen 19 and carrying out the control for moving the motorized stage 20 to a position indicated by the present coordinates, and also notifying the microscope controller 31 of the object lens information (B_ob), brightness adjustment value information (B_bright) and microscopy information (B_posi) which are the pieces of microscope information at the time of obtaining the present image, thereby changing over the object lenses 23, controlling the brightness of the transmission illumination-use light source 6, and changing over the microscopy.

In S210, a detail observation (i.e., a process for displaying a live image) by using the microscope apparatus 1 in which the observation state at the time of obtaining the image currently displayed in the display window 36 is started. In the subsequent S211, carried out is the process for obtaining an instruction for operating the microscope apparatus 1 and a detail observation is performed by changing over to an object lens 23 of a high magnification ratio.

FIG. 7 shows a state of making the display window 36 display a more detail image of the specimen 19 imaged by the video camera 3 by a detail observation carried out by changing over to an object lens of a high magnification ratio in the screen example (i.e., the image of the specimen 19 at the point B is in display) shown in FIG. 4. An enlarged image of the point B of the specimen 19 indicated in the display window 36 of FIG. 4 is shown in the display window 36 of FIG. 7.

In S212, carried out is the process for judging whether or not an instruction for recording a detail image (i.e., an enlarged image) of the specimen 19 currently displayed in the display window 36 is obtained, by a pressing operation for operation (noted as "pressing operation" hereinafter) of the record button 43. Here, if the judgment is that the aforementioned recording instruction is obtained (i.e., the judgment result is "yes"), the process proceeds to S214, while if the judgment is that the aforementioned recording instruction is not obtained (i.e., the judgment result is "no"), the process proceeds to S213.

In the S213, carried out is the process for judging whether or not an instruction for returning to the original motion image display from the display of the display window 36 is obtained, by a pressing operation of the motion image display button 49. Here, if the judgment is that the aforementioned instruction is obtained (i.e., the judgment result is "yes"), the process returns to the S201 and the above described process is repeated. Contrarily, if the judgment is that the aforementioned instruction is not obtained (i.e., the judgment result is "no"), the process returns to the S210 and the display of the detail image of the specimen 19 is continued.

In S214, carried out is the process for obtaining the coordinate data indicating the current position of the specimen 19 from the motorized stage 20 by way of the microscope controller 31. In the subsequent S215, carried out is the process for obtaining the microscope information indicating the current observation state of the microscope apparatus 1 such as object lens information identifying the currently used object lens 23, brightness adjustment value information indicating the brightness of the transmission illumination-use light source 6, microscopy information indicating the microscopy, and such. And in S216, carried out is the process for recording, in the data recording unit 4, data of the detail microscopic image (i.e., an enlarged still image), which is currently displayed in the display window 36 and which is newly obtained after a reproduction of the observation state, of the specimen 19 by associating with (i.e., by linking with) a replay position of the motion image data. Upon completing the process of the S216, the process proceeds to the judgment process of the S213.

The next is a description of a specific example of the process of the S212 through S216.

Let it be assumed a case of a pressing operation of the record button 43 being obtained when displaying the screen shown in FIG. 7 is displayed in the monitor 5. In this event, the host system 2 adds information associating the microscopic image, which is displayed in the display window 36 at the time of the reproduction button 53 being operated, with the detail microscopic image (i.e., an enlarged still image), newly obtained after reproducing the observation state, of the specimen 19, to the data of the motion image displayed by the display window 36. Together with this, the host system 2 records the data of the present detail microscopic image in the data recording unit 4.

Figure 8:
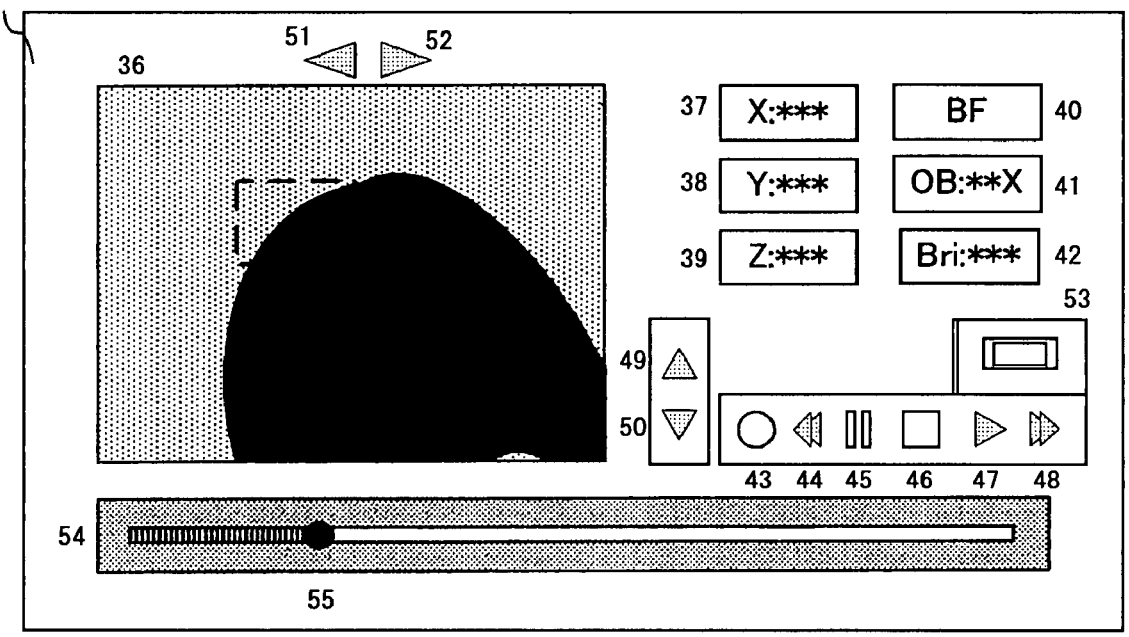
FIG. 8 is a diagram showing a fourth example of a screen display when displaying an image of a specimen of which motion image data is recorded in a data recording unit.

After recording the detail image of the specimen 19, followed by a pressing operation of the motion image display button 49, for display-reproducing the motion image of the specimen 19, then a display, by means of the dotted line rectangle S1, indicating the fact of the detail still image existing is carried out in the position where the linked detail still image exists as shown in the screen example of FIG. 8.

By the process of the subsequently carried out S201, when an operation of selecting the zone S1 by an operation of a pointing device or such is obtained, or when a pressing operation of the detail display button 50 is obtained, then the detail still image photographed by using an object lens 23 of a high magnification ratio is displayed in the display window 36 as shown in the screen example of FIG. 7. And, when a pressing operation of the motion image display button 49 is carried out with the detail still image being displayed, a display reproduction of a motion image including the existing position of the detail still image is carried out in the display window 36 as shown in a screen example of FIG. 8.

As described above, the microscope system according to the present embodiment is configured to record coordinates of the specimen 19 and an observation state of the microscope apparatus 1 automatically by synchronizing with the record of a motion image of the specimen 19 carried out during a screening thereof. This configuration makes it possible to easily find a point for carrying out a detail observation. It further makes it possible to reproduce an observation state of the microscope apparatus 1 at the time of a screening of a point, no matter what point in the screening path it may be, which has not become the point that is desired for a detail observation until the time of observing a motion image display-reproduced after finishing the screening. This in turn shortens time of a recording work of detail observation data, thereby reducing a load on the user greatly.

Note that the present embodiment is configured to directly read the coordinate data recorded in correlation with each frame of a motion image for reproducing a position of the specimen 19. As an example here, if a configuration is such that coordinate data are recorded at the individual positions of the black dots on the locus of a screening as shown in FIG. 9, and if an instruction is given to reproduce the position of the white dot at which coordinate data is not recorded, it is possible to reproduce the position of the specimen 19 as described in the following. That is, it is possible to reproduce the position of the specimen 19 based on a result of calculating the coordinates of the aforementioned white dot by an interpolation operation based on the individual coordinates of b and c that are the positions of black dots in the front and back of the present white dot, or one based on the individual coordinates of a, b, c and d. It is also possible to reproduce the position of the specimen 19 by using the coordinates of which the position is closer to the present white dot between the black dots b and c in the front and back of the present white dot.

Note that the description of the present embodiment has exemplified the object lens information, brightness control value information and microscopy information as the microscope information recorded together with the motion image data. An alternative configuration may be in a manner to record at least either one, or more, kind of the aforementioned information as the microscope information. Yet another configuration may be in a manner to record other information of a filter, aperture and such as the microscope information.

And the description of the present embodiment has exemplified the object lens information, brightness control value information and microscopy information as the microscope information to be reproduced in the microscope apparatus 1. An alternative configuration may be in a manner for a user to select discretionarily the microscope information to be reproduced. Yet another configuration may be in a manner to enable a designation such as to reproduce the position information in the X-Y direction of the specimen 19 for example.

The next is a description on another example of an operation at the time of a screening work among the operations of the microscope system shown in FIG. 1 as a second embodiment of the present invention. An operation at the time of the screening work described in the following is configured to enable a manual or automatic designation of a point for a later examination at the time of recording a motion image carried out during the screening of the specimen 19. Such a configuration makes it possible to further ease a search of a detail observation point to be carried out later.

Figure 10:
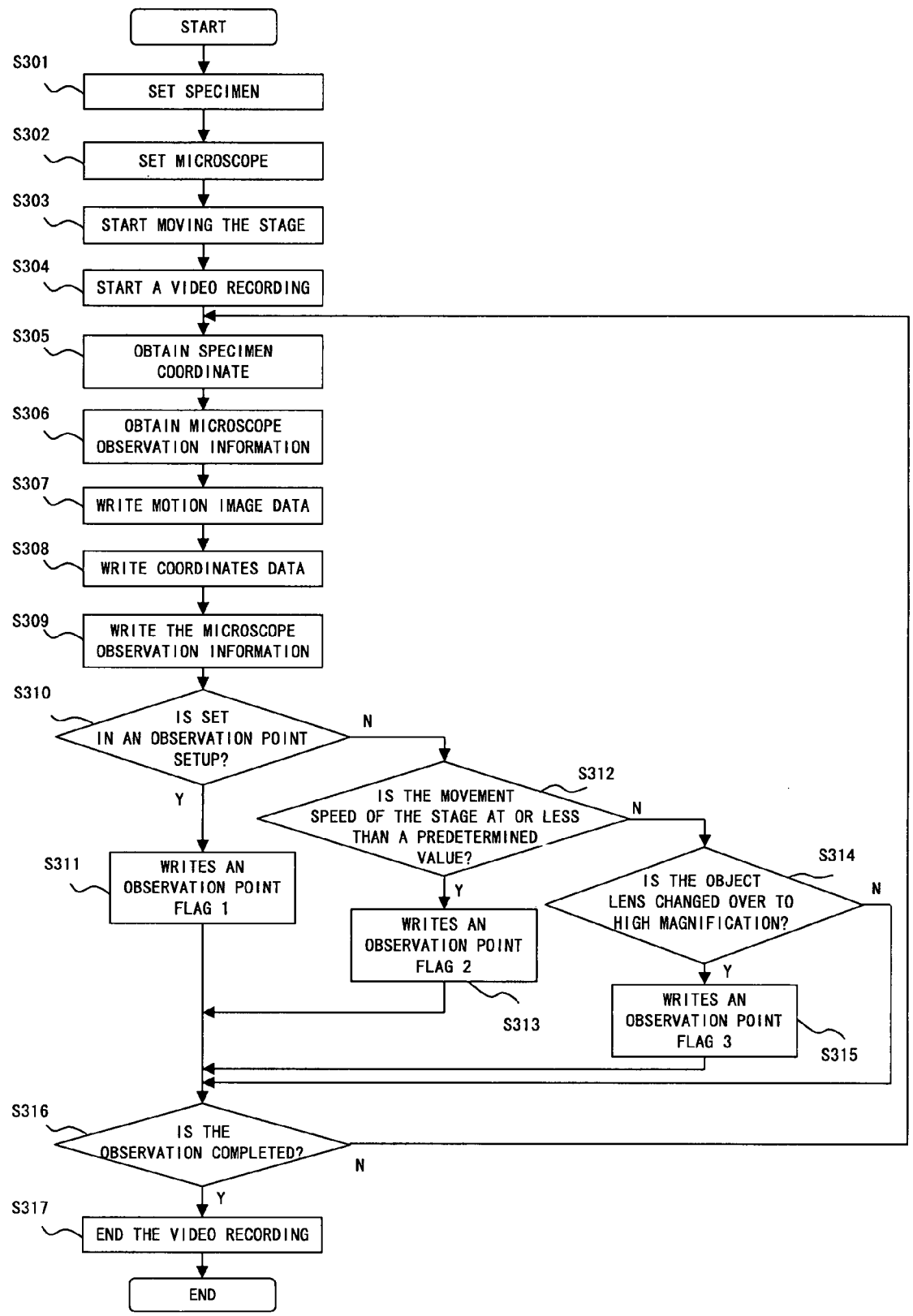
FIG. 10 is a diagram showing a second example of a process content, in a flow chart, of a process for recording motion image data at the time of a screening work.

The next is a description of FIG. 10 which shows a second example of a process content, in a flow chart, of a process carried out by the host system 2, for recording motion image data at the time of a screening work. This is a process for obtaining motion image data when carrying out a screening for the specimen 19 at the microscope system shown in FIG. 1. The process is achieved by the CPU of the host system 2 executing a prescribed control program.

Figure 11:
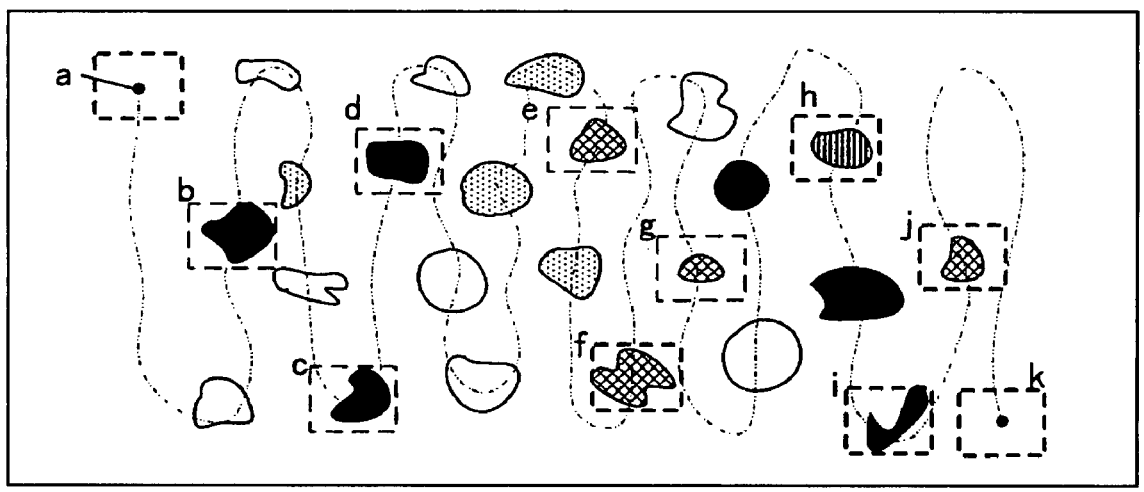
FIG. 11 is a diagram showing a second example of a path of screening a specimen.

FIG. 11 shows a second example of a path of screening the specimen 19. The curve shown by a double dot chain line indicates a path of a screening by using an object lens of a low magnification ratio in the showing of FIG. 11. And the zone shown by a dotted line rectangle in the drawing indicates a range of field of vision for the object lens of the low magnification ratio. Incidentally, the assumption here is that a screening employs a transmissive bright field observation.

Referring to FIG. 10, carried out first in S301 is the process for moving the motorized stage 20 to a predetermined position in order to carry out a setup work of the specimen 19 onto the motorized stage 20.

Upon finishing the setup of the specimen 19, the process proceeds to S302 and a microscope setup process is carried out. This process controls the microscope apparatus 1 and changes over various optical elements to be used for a transmissive bright field observation and object lenses of low magnification ratios to be used for a screening.

In S303, an operation content of a user for a joy stick and an encoder which are equipped in the microscope operation unit 34 and the process for moving the motorized stage 20 in accordance with the obtained operation content is started. The path from the points "a" to "e" indicated by the double dot chain line of the example of FIG. 11 is the path of the screening instructed by the user in this event.

As a movement of the motorized stage 20 is started, so is started in S304 is a recording process for generating motion image data from a microscopic image of the specimen 19 imaged by the video camera 3 in a time series and recording the data in the data recording unit 4. A repetition of the processes of the subsequent S305 through S316 results in recording a motion image of the specimen 19.

In S305 and S306, carried out is the process for making the host system 2 function as observation state obtainment unit for obtaining the observation state of the microscope apparatus 1 at the time of obtaining a microscopic image of the specimen 19. That is, carried out in the S305 is the process for obtaining coordinate data of the motorized stage 20 indicating the current position of the specimen 19. And carried out in the subsequent S306 is the process for obtaining microscope information indicating the current observation state of the microscope apparatus 1, such as object lens information identifying the currently used object lens 23, brightness adjustment value information indicating the brightness of the transmission illumination-use light source 6, microscopy information indicating microscopy.

In the processes from S307 through S309, carried out is the process for making the host system 2 function as correlation addition unit and record unit that make the data recording unit 4 record the imaged microscopic image of the specimen 19 and the observation state of the microscope apparatus 1 at the time of obtaining the microscopic image by correlating with each other. That is, carried out in the S307 is the process for recording data of the current microscopic image (i.e., an image for one frame of motion image data) of the specimen 19. And carried out in the subsequent S308 is the process for recording the coordinate data obtained by the process of the S305 in the data recording unit 4 by adding it to the microscopic image recorded by the process of the S307. Further in the subsequent S309, carried out is the process for recording the microscope information obtained by the process of the S306 in the data recording unit 4 by adding it to the microscopic image recorded by the process of the S307.

The process of the above described S307 through S309 results in adding coordinate data (b_x, b_y, b_z) indicating a position of the point b of the specimen 19 and microscope information such as object lens information (b_ob), brightness adjustment value information (b_bright) and microscopy information (b_posi), followed by correlating the present microscopic image data with the motion image data and recording the resultant in the data recording unit 4, likewise the first example shown in FIG. 2.

A description at this point is on a setup of an observation point by the user.

An observation point is one for setting at the time of recording a motion image of the specimen 19. Note that, if a specified observation point is designated for one frame of a motion image as a specific start point when replaying the aforementioned motion image of the specimen 19 recorded in the data recording unit 4, the motion image can be replayed from the start point.

The present embodiment is configured to provide three kinds of methods, i.e., a setup by the user, a setup based on a movement speed of the motorized stage 20, and a setup based on a changeover of object lenses, as the method for setting an observation point. The processes from S310 through S315 are the ones for setting an observation point based on these setup methods. Note that these processes are for making the host system 2 function as flag addition unit for adding flag information to some of microscopic images of a time series constituting a motion image of the specimen 19.

In S310, carried out is the process for judging whether or not an instruction for setting an observation point is obtained. Here, if the judgment is that the aforementioned instruction is obtained (i.e., the judgment result is "yes"), carried out in S311 is the process for adding "observation point flag 1" to the microscopic image recorded by the process of the S307, followed by proceeding the process to S316. In this event, the "observation point flag 1" is flag information added to one frame of a motion image when an observation point is set by a user.

Contrarily, if the judgment of the process of the S310 is that the aforementioned instruction is not obtained (i.e., the judgment result is "no"), carried out in S312 is the process for judging whether or not a movement speed of the motorized stage 20 has become a predetermined speed or slower. Note that the movement speed of the motorized stage 20 can be calculated on the basis of a control signal, for example, given to the stage X-Y drive control unit 21 from the microscope controller 31. An alternative configuration may be in a manner to equip the motorized stage 20 with a velocity sensor for directly detecting the movement speed and utilize the detection result of the velocity sensor.

If the judgment of the judgment process in the S312 is that the aforementioned movement speed is at or lower than the predetermined speed (i.e., the judgment result is "yes"), the point of the specimen 19 observed in the event is assumed to be the point desired by the user for a detail observation, followed by the process proceeding to S313. Then carried out in the S313 is the process for adding "observation point flag 2" to the microscopic image recorded by the process of the S307, followed by the process proceeding to S316. Here, the "observation point flag 2" is flag information automatically added to one frame of the motion image when the movement speed of the motorized stage 20 becoming a predetermined value or less.

Contrarily, if the judgment of the process of the S312 is that the aforementioned instruction is not obtained (i.e., the judgment result is "no"), then carried out in S314 is the process for judging whether or not an operation of changing the object lens 23, which was used up to then, over to that of a higher magnification ratio has been carried out. Here, if the judgment is that the aforementioned changeover operation is carried out (i.e., the judgment result is "yes"), the point of the specimen 19 observed up to then is assumed to be the one that the user desired for a detail observation, followed by the process proceeding to S315. Then, carried out in the S315 is the process for adding "observation point flag 3" to the microscopic image recorded by the process of the S307, followed by the process proceeding to S316. Here, the "observation point flag 3" is flag information automatically added to one frame of the motion image when an operation of changing the object lens over to that of a high magnification ratio is carried out at the microscope apparatus 1.

The next is a description of specific examples of the processes of the S311 through S315.

As an example, when the user instructs for setting an observation point to the point b of the example shown in FIG. 11, the judgment result of the S310 becomes "yes", and the process of the S311 is carried out. This prompts an addition of the "observation point flag 1" to the image data of the point b in the motion image data, in addition to adding the above described microscope information.

As such, the user is enabled to set an observation point at a discretionary point even during a screening work. Note that the example of FIG. 11 assumes that the user sets the observation points at the respective points a, b, c, d and i.

As another example, if the movement speed of the motorized stage 20 becomes a predetermined speed or slower at the point e in the example of FIG. 11, the judgment result of the S312 becomes "yes" and the process of the S313 is carried out. This prompts an addition of the "observation point flag 2" to the image data of the point e in the motion image data, in addition to adding the above described microscope information.

That is, carrying out a careful observation by lowering the movement speed of the motorized stage 20 at the time of an observation of the specimen 19 during a screening work results in adding the "observation point flag 2" automatically to the observation point. Incidentally, the example of FIG. 11 assumes that the "observation point flag 2" is set to the points e, f, g, and j on the basis of the movement speed of the motorized stage 20.

As yet another example, if the object lens 23 is changed over to that of a high magnification ratio, at the point h in the example of FIG. 11, the judgment result of the S314 becomes "yes" and the process of the S315 is carried out. This prompts an addition of "observation point flag 3" to the image data of the point h in the motion image data, in addition to adding the above described microscope information.

That is, carrying out a careful observation by changing the object lens 23 over to a high magnification ratio at the time of an observation of the specimen 19 during a screening work results in adding the "observation point flag 3" automatically to the observation point.

Now the description returns to FIG. 10.

In S316, carried out is the process for judging whether or not the observation is completed with the movement to the end point (i.e., the point k in the example of FIG. 11) of the screening path being finished. Note that the host system 2 recognizes the end of the observation by receiving an instruction from the user for example.

If the judgment result of the judgment process of the S316 is that the observation is completed (i.e., the judgment result is "yes"), then carried out in S317 is the process for making the video recording process, which was started by the process of the S304, ended, followed by ending the recording process of the motion image data shown in FIG. 10. Contrarily, if the judgment is that the observation is not yet completed (i.e., the judgment result is "no"), the process returns to the S305 and the above described processes are repeated.

The execution of the above described processes as described above results in recording the coordinate data of the specimen 19 at the individual position in a screening path synchronously with the record of the motion image data obtained by observing the specimen 19 along the screening path, and further recording the observation point flags together.

The next is a description on an operation for finding a point for carrying out a detail observation from a recorded motion image of the specimen 19, reproducing the observation state of the microscope apparatus 1 at the time of observing the point and also recording observation data by observing a detail of the point by using an object lens of a high magnification ratio after finishing a screening of the specimen 19.

The first is a description of FIG. 12 which shows another example of a screen display, by using the monitor 5 connected to the host system 2, when displaying an image of the specimen 19 of which the motion image data is recorded in the data recording unit 14. Note that, in the showing of FIG. 12, the same component sign is assigned to the same constituent component as that of the first example shown in FIG. 4 and the description is accordingly omitted here.

The process contents of the control process carried out by the host system 2 for displaying an image of the specimen 19 of which motion image data is recorded in the data recording unit 4 is the same as the case shown in FIG. 5. Here, the description is on the process of a display reproduction of the S201 in the case of the capture display button 54, skip button 55 or 56 being operated in a state of the replay window 35, which is shown in FIG. 12, being displayed.

First, when a pressing operation of the capture display button 54 is obtained, carried out is the process for searching an image, to which an observation point flag is added, from the motion image data of the specimen 19 recorded in the data recording unit 4. Then carried out is the process for displaying a catalog of the entire images (i.e., capture images), to each of which an observation point flag is added, in the display window 36 by reducing the images. The screen example of FIG. 12 shows a situation of a catalogue of the capture images being displayed by the process, in which the capture images of the respective points b, c, d, e, f, g, h, i and j of the specimen 19 shown in FIG. 11 are displayed in the display window 36.

Referring to the screen of FIG. 12, when a selection of the capture image of the point c is obtained by an operation by a pointing device or such, the process for making the display window 36 display the image of the specimen 19 at the point c is carried out as shown in FIG. 13. In this event, carried out is the process for reading various data related to the point c from the motion data of the specimen 19 and displaying the coordinate data (c_x, c_y, c_z) indicating the position of the point c of the specimen 19, brightness adjustment value information (c_bright) and microscopy information (c_posi) in the coordinate display windows 37, 38 and 39, object lens window 41, brightness adjustment value window 42 and microscopy window 40, respectively, at once.

Note that, if a pressing operation of the reproduction button 53 in a state of the screen of FIG. 13 being displayed, the processes of the S208 shown in FIG. 5 and thereafter are likewise carried out. That is, the first process carried out is to notify the microscope controller 31 of the coordinates (c_x, c_y, c_z) indicating the position of the point c of the specimen 19 and make the motorized stage 20 move to the position indicated by the aforementioned coordinates. Then, in addition to the aforementioned process, carried out is the process for notifying the microscope controller 31 of the microscope information at the time of obtaining the present image, i.e., the object lens information (c_ob), brightness control value information (c_bright) and microscopy information (c_posi), and making it change over the object lenses 23, adjust the brightness of the transmission illumination-use light source 6 and change over the microscopy. This results in starting a detail observation by the microscope apparatus 1 in which the observation state at the time of obtaining the image currently displayed in the display window 36 is reproduced, followed by the detail observation by changing over to an object lens 23 of a high magnification ratio being carried out.

Comparably, if a pressing operation of the skip button 55 or 56 is obtained, the process is carried out, in which a display reproduction of the motion image of the specimen 19 in the display window 36 is temporarily paused, and then a display reproduction of the motion image starting from the position of an image to which an observation point flag is added and which is the front or back of the replay position of the image, of the present motion image, displayed at the point in time is restarted.

As an example, if a pressing operation of the skip button 56 is carried out when the image of the point e of the motion image of the specimen 19 is displayed in the display window 36, a display reproduction is carried out from the point f of the present motion image. In this event, if a pressing operation of the skip button 56 is repeated, the start position of the display reproduction is changed over to points g, h, and so on, at every time the button is pressed. And if a pressing operation of the skip button 55 is carried out when the image of the point e of the motion image of the specimen 19 is displayed in the display window 36, the start position of the display reproduction is changed over to points d, c, and so on.

Having obtained an operation on the capture display button 54 or skip button 55 or 56 that is a display instruction unit as described above, the host system 2 makes the display window 36 display the microscopic image to which an observation point flag is attached.

And, if a pressing operation of the reproduction button 53 is obtained in this state, the processes of the S208 and thereafter shown in FIG. 5 are carried out in the same manner. That is, carried out is the process for notifying the microscope controller 31 of the coordinates of a point of the specimen 19 displayed in the display window 36 at that time to have the microscope controller 31 make the motorized stage 20 move to the position indicated by the aforementioned coordinates, and also notifying the microscope controller 31 of the microscope information at the time of obtaining the present image for having it carry out a changeover of the object lenses, an adjustment of the brightness of the transmission illumination-use light source 6 and a changeover of the microscopy. As a result, a detail observation by the microscope apparatus 1 in which the observation state at the time of obtaining the image currently displayed in the display window 36 is started and a detail observation by changing over to an object lens 23 of a high magnification ratio is carried out.

As described above, the microscope system according to the present embodiment enables a recording of coordinates of the specimen 19 and of an observation state of the microscope apparatus 1 synchronized with a recording of a motion image taken during a screening of the specimen 19 and also a manual or automatic designation of a point to be observed in detail. Such a configuration makes it possible to further ease a search of a detail observation point after the screening. It further enables a reproduction of an observation state of the microscope apparatus 1 at the time of observing the point, thereby shortening time of the work for recording detail observation data and lightening a load on the user greatly.

Note that the present embodiment is configured to make the display window 36 display a catalog of all images, each of which is attached with an observation point flag, of the motion image data of the specimen 19 recorded in the data recording unit 4 at the time of a pressing operation of the capture display button 54 being obtained. An alternative configuration may be in a manner to make the display window 36 display a catalog of all images, each of which is attached with the "observation point flag 1" indicating an observation point instructed by the user for the setup. FIG. 14 exemplifies a screen image of making the display window 36 display a catalog of all images, each of which is attached with "observation point flag 1".

Another alternative configuration may be in a manner to make the display window 36 display a catalog of all images, each of which is attached with the "observation point flag 2" indicating an observation point based on a movement speed of the motorized stage 20 or the "observation point flag 3" indicating an observation point based on a magnification ratio of the object lens 23 used for an observation. It further may be in a manner to enable a selection of a display of these catalogues.

Also note that the present embodiment is configured to attach a setup flag of an observation point automatically to the motion image data based on a movement speed of the motorized stage 20 and a magnification ratio of the object lens 23 used for an observation. An alternative configuration may be in a manner to attach a setup flag of an observation point automatically to the motion image data based on a state of other setups of the microscope or a combination of those.

Incidentally, in order to make the host system 2 carry out the processes shown by the respective flow charts of FIGS. 2, 5 and 10, it is merely necessary to create a control program for making a CPU comprised by a computer of a standard configuration as described above, have a computer readable recording medium record the control program and make the computer read the program from the recording medium and have the CPU execute the program.

A recording medium allowing a computer to read a recorded control program can utilize, for example, a storage apparatus such as ROM and hard disk apparatus comprised by the computer as a built-in or external attachment apparatus, and/or a portable recording medium such as a flexible disk, magneto optical (MO) disk, CD-ROM, DVD-ROM, which allow a readout of the recorded control program by being inserted into a media drive apparatus comprised by the computer.

The recording medium may be a storage apparatus comprised by a computer system functioning as program server that is connected to the computer by way of a telecommunication line. In such a case, a configuration is in a manner to transmit a transmission signal obtained by modulating a carrier wave with a data signal expressing the control program from the program server to the computer by way of a telecommunication line that is a transmission medium. And the computer demodulates the received transmission signal for reproducing the control program, thereby making it possible for the CPU of the computer to execute the control program.

As described above, when using the microscope system according to the individual embodiments of the present invention, first is to operate the motorized stage capable of moving an observation specimen in a plane perpendicular to the observation light path from the object lens and carry out a screening by an operation so as to cover the entirety of the specimen by setting an object lens to a low magnification. Then return to a point where an abnormal region is discovered or a point to be desired to keep a record within the observation specimen, and further examine the abnormal region in detail by changing the object lens over to that of a higher magnification ratio. This prompts a recording of the motion image of the screening and also, synchronously with it, a recording of the coordinate of the observation specimen and that of the state of the microscope in this event. The use of these records makes it possible to search a point to be desired for a detail observation and further reproduce the state of the microscope system at the time of observing the point in the screening. This results in shortening time of a work for recording detail data, improving a speed of a work for reproducing a detail observation point and lightening a load on the user greatly.

While such is the description of the individual embodiments of the present invention; it can be, however, improved and/or changed in various manners possible within the scope of the present invention, in lieu of being limited to the above described individual embodiments.

As an example, the microscope systems according to the individual embodiments described above are configured to employ an upright microscope apparatus as the microscope apparatus 1. An alternative configuration may of course employ an inverted microscope apparatus, and the present embodiments are of course applicable to various systems such as a line apparatus incorporating a microscope apparatus.

Another configuration may be in a manner to photograph first a macro image of the entirety of the specimen 19 shown in FIGS. 3 and 11, and display a locus and the current replay position in the macro image, thereby enabling an easy recognition of the current replay position. Or it may be in a manner to enable a designation of a replay start position of a motion image in the present macro image. Yet another configuration may be in a manner that the host system 2 automatically conducts a screening work, which is carried out by the user operating the motorized stage discretionarily, along a prescribed path so that the user designates a detail observation point for a replay image of the obtained motion image of the specimen 19.

What is claimed is:
1. A microscope system, comprising:
a microscope for obtaining a microscopic image of a specimen;
an observation state obtainment unit for obtaining an observation state of the microscope at a time of obtaining the microscopic image;
a motion image data generation unit for generating data of a motion image from microscopic images of a time series;
a correlation addition unit for adding, to data of the motion image, information that correlates microscopic images constituting the motion image with an observation state of the microscope at a time of obtaining the microscopic images;
a record unit for recording data of the motion image and an observation state of the microscope correlated with the data;
a display unit for displaying a microscopic image by replaying the motion image based on data of the motion image recorded in the record unit;
a motion image operation unit for controlling replay of the motion image in the display unit to search for a microscopic image to perform a reproduction;
a reproduction instruction obtainment unit for obtaining an instruction to make the microscope reproduce the observation state;

a microscope control unit for controlling the microscope to reproduce the observation state at the time of obtaining the microscopic image displayed in the display unit when the instruction for the reproduction is obtained; and a flag addition unit for adding predetermined flag information to a microscopic image included in the microscopic images of a time series and obtained by the microscope when a movement speed of a freely movable stage which is equipped in the microscope and on which the specimen is placed becomes a predetermined value or less, or to a microscopic image included in the microscopic images of a time series and obtained by the microscope when an object lens used in the microscope is changed to an object lens with a higher magnification ratio.

2. The microscope system according to claim 1, wherein the observation state includes a position of the freely movable stage.

3. The microscope system according to claim 2, wherein the motion image data generation unit generates data of the motion image based on microscopic images obtained between a movement start and a movement end of the stage.

4. The microscope system according to claim 1, wherein the observation state includes at least one of a magnification ratio of an object lens used in the microscope at a time of obtaining the microscopic images, brightness of a light source illuminating the specimen at the time of obtaining the microscopic images, and a microscopy used in the microscope at the time of obtaining the microscopic images.

5. The microscope system according to claim 1, further comprising a display instruction obtainment unit for obtaining an instruction for displaying a microscopic image to which the flag information is added, wherein the display unit displays a microscopic image to which the flag information is added when the display instruction obtainment unit obtains the instruction.

6. The microscope system according to claim 1, wherein the record unit further records a microscopic image obtained by the microscope anew after the observation state is reproduced, and wherein the microscope system further comprises an association addition unit for adding, to data of the motion image, information that associates a microscopic image displayed in the display unit at the time of obtaining the instruction for the reproduction with the microscopic image obtained anew by the microscope after the observation state is reproduced.

7. A method for recording a microscopic image, comprising:

obtaining an observation state of a microscope at a time of obtaining the microscopic image of a specimen obtained by using the microscope;

generating data of a motion image from microscopic images of a time series;

adding, to data of the motion image, information that correlates microscopic images constituting the motion image with an observation state of the microscope at a time of obtaining the microscopic images;

recording data of the motion image and an observation state of the microscope correlated with the data;

displaying a microscopic image by replaying the motion image based on data of the motion image recorded in the record unit;

controlling replay of the motion image in the display unit to search for a microscopic image to perform a reproduction;

obtaining an instruction to make the microscope reproduce the observation state; and when the instruction for the reproduction is obtained, controlling the microscope to reproduce the observation state at the time of obtaining the microscopic image displayed in the display unit; and adding predetermined flag information to a microscopic image included in the microscopic images of a time series and obtained by the microscope when a movement speed of a freely movable stage which is equipped in the microscope and on which the specimen is placed becomes a predetermined value or less, or to a microscopic image included in the microscopic images of a time series and obtained by the microscope when an object lens used in the microscope is changed to an object lens with a higher magnification ratio.

8. A non-transitory computer-readable recording medium having stored thereon a program that is executable by a computer to control the computer to record a microscopic image, the program controlling the computer to perform processes comprising:

obtaining an observation state of a microscope at a time of obtaining a microscopic image of a specimen obtained by using the microscope;

generating data of a motion image from microscopic images of a time series;

adding, to data of the motion image, information that correlates microscopic images constituting the motion image with an observation state of the microscope at a time of obtaining the microscopic images;

recording data of the motion image and an observation state of the microscope correlated with the data;

displaying a microscopic image by replaying the motion image based on data of the motion image recorded in the record unit;

controlling replay of the motion image in the display unit to search for a microscopic image to perform a reproduction;

obtaining an instruction to make the microscope reproduce the observation state;

when the instruction for the reproduction is obtained, controlling the microscope to reproduce the observation state at the time of obtaining the microscopic image displayed in the display unit; and adding predetermined flag information to a microscopic image included in the microscopic images of a time series and obtained by the microscope when a movement speed of a freely movable stage which is equipped in the microscope and on which the specimen is placed becomes a predetermined value or less, or to a microscopic image included in the microscopic images of a time series and obtained by the microscope when an object lens used in the microscope is changed to an object lens with a higher magnification ratio.

* * * * *